United States Patent
Tsai et al.

(10) Patent No.: US 8,391,560 B2
(45) Date of Patent: Mar. 5, 2013

(54) METHOD AND SYSTEM FOR IMAGE IDENTIFICATION AND IDENTIFICATION RESULT OUTPUT

(75) Inventors: Ya-Hui Tsai, Pingihen (TW); Yu-Ting Lin, Sanchong (TW); Kuo-Tang Huang, Pingihen (TW); Chun-Lung Chang, Hsinchu (TW); Tung-Chuan Wu, Hsinchu (TW)

(73) Assignee: Industrial Technology Research Institute, Hsin-chu (TW)

( * ) Notice: Subject to any disclaimer, the term of this patent is extended or adjusted under 35 U.S.C. 154(b) by 852 days.

(21) Appl. No.: 12/512,670

(22) Filed: Jul. 30, 2009

(65) Prior Publication Data

US 2010/0278436 A1    Nov. 4, 2010

(30) Foreign Application Priority Data

Apr. 30, 2009    (TW) ................................ 98114329 A (51) Int. Cl.
*G06K 9/00* (2006.01)
*G06K 9/62* (2006.01)
*G06K 9/66* (2006.01)

(52) U.S. Cl. ........ 382/105; 382/104; 382/176; 382/177; 382/181; 382/190; 382/209; 382/216; 382/218; 382/220; 382/289; 382/290

(58) Field of Classification Search .................. 382/105, 382/104, 176, 177, 181, 190, 206, 216, 218, 382/220, 289, 290
See application file for complete search history.

(56) References Cited

U.S. PATENT DOCUMENTS

| | | | |
|---|---|---|---|
| 4,817,166 A | | 3/1989 | Gonzalez et al. |
| 5,081,685 A | | 1/1992 | Jones, III et al. |
| 5,425,108 A | | 6/1995 | Hwang et al. |
| 5,651,075 A | * | 7/1997 | Frazier et al. ............... 382/105 |
| 5,835,632 A | * | 11/1998 | Takasu et al. ............... 382/185 |
| 6,094,501 A | * | 7/2000 | Beatty ........................ 382/154 |
| 6,466,926 B1 | * | 10/2002 | Kawatani ..................... 706/20 |
| 6,473,517 B1 | * | 10/2002 | Tyan et al. .................. 382/105 |
| 6,553,131 B1 | | 4/2003 | Neubauer et al. |
| 6,754,369 B1 | * | 6/2004 | Sazawa ....................... 382/105 |
| 7,620,268 B2 | * | 11/2009 | Myers et al. ................. 382/289 |
| 2005/0053282 A1 | * | 3/2005 | Suen et al. .................. 382/182 |
| 2009/0263019 A1 | * | 10/2009 | Tzadok et al. .............. 382/176 |

FOREIGN PATENT DOCUMENTS

| | | |
|---|---|---|
| TW | 200532586 B | 7/2005 |
| TW | 200731144 A | 8/2007 |
| TW | 200807311 A | 2/2008 |

* cited by examiner

*Primary Examiner* — Michael A Newman
(74) *Attorney, Agent, or Firm* — Rabin & Berdo, P.C.

(57) ABSTRACT

The present invention provides a method and a system for image identification and identification result output, which determines a location coordinate with respect to an image and a rotating angle based on at least one direction of the image according to features of the image. The image is compared to a plurality of sample images stored in a database according to the rotating angle so as to obtain at least one identification result. By means of the method and the system of the present invention, identification can be achieved with respect to various rotating angles and distances so as to improve the identification rate.

25 Claims, 13 Drawing Sheets

|  |  |  |  | - | 1 | 2 | 3 | 2 |
|---|---|---|---|---|---|---|---|---|
| 1st Possible Result | Character | A | B |  |  |  |  |  |
|  | Similarity Index | 63 | 76 |  | 52 | 72 | 67 | 72 |
| 2nd Possible Result | Character | O | D |  |  |  |  |  |
|  | Similarity Index | 0 | 54 |  | 8 | 8 | 9 | 4 |
| 3rd Possible Result | Character | Q | E |  |  |  |  |  |
|  | Similarity Index | 50 | 45 |  | 41 | 16 | 62 | 40 |
| 4th Possible Result | Character | H | H |  |  |  |  |  |
|  | Similarity Index | 45 |  |  | 0 | 6 | 8 | 3 |
|  |  | 43 | 43 |  | 30 | 14 | 45 | 37 |
|  |  |  |  |  | 4 | 3 | 0 | 0 |
|  |  |  |  |  | 24 | 0 | 36 | 18 |

METHOD AND SYSTEM FOR IMAGE IDENTIFICATION AND IDENTIFICATION RESULT OUTPUT

FIELD OF THE INVENTION

The present invention generally relates to an image identification technology and, more particularly, to a method and a system for image identification and identification result output, which determine conditions for acquiring the image according to features of the image and compare the conditions with sample images corresponding to the conditions.

BACKGROUND OF THE INVENTION

There are many people who get killed in traffic accidents. Theft and burglary using cars/motorcycles have been repeatedly reported. These may be attributed to poor image identification of license plates because of poor monitoring systems. Such monitoring systems are mostly problematic because of poor resolution (320×240 Pixels) and slant angles of the image acquiring units to cause blur or incomplete images that cannot be recognized so that the criminals can be at large.

Conventionally, in Taiwan Patent No. 197752, a CCD camera and an image acquiring unit are used to acquire a car image in the car lane and the car image is then read by an image reading unit. Then, a logarithmic greyscale operation unit is used to calculate the logarithmic greyscale of each pixel in the car image. The image corresponding to the logarithmic greyscales is decomposed by a wavelet decomposition unit into rough images, horizontally differentiated images, vertically differentiated images and diagonally differentiated images. An image binarization unit converts the logarithmic greyscale of each pixel in the horizontally differentiated images from real numbers into binary digits 0 and 1. A rough image dividing unit determines a region with the highest sum of binary digits within the whole car image according a pre-set license plate size and thus the region is initially referred to as a license plate region. Then, a license plate slantness correction unit corrects the slantness of the image corresponding to the license plate region. Finally, a fine image dividing unit removes the part that does not correspond to the license plate from the rough license plate region.

Moreover, in Taiwan Patent Pub. No. 1286027, an integrated plurality of lane free flow vehicle enforcement system is disclosed, wherein a portal framed equipment is established at the image enforcement point. The car lane is physically divided so that image enforcement can be realized with respect to various cars even though the system slows the cars to pass by the image enforcement point at a normal speed and to change lanes freely.

Moreover, in Taiwan Patent Appl. No. 200802137, a serial license plate identification system is disclosed, using a license plate character region detection module to receive an image and determine each approximate license plate range in the image. Sequences of serial identical pixels in each approximate license plate range are obtained. The sequences of serial identical pixels are erased, filtered, and connected to blocks so as to obtain the image with respect to the license plate character region in each approximate license plate range and output verified image with respect to the license plate character region after verification. Then, the verified image with respect to the license plate character region is transmitted to the a license plate character dividing and identification module to acquire all the independent character images and thus all the license plate character information after the independent character images are identified.

Moreover, Taiwan Patent No. 221193 discloses a license plate identification and monitoring apparatus used in a parking area. When a car passes by a predetermined image acquiring spot, the host is informed to enable the duplex image acquiring device to control the camera device to acquire the car license plate image, which is then processed by the an identification process to identify the characters on the license plate for car management, stolen car seeking and prevention in the parking area.

Taiwan Patent No. 226454 discloses a license plate identification method, wherein the logic relation and character strokes are used to determine the correct license plate location in the digital image. Then, ternarized difference and fuzzy inference are used to acquire the outlines of the characters on the license plate. Adaptive binarization method is used to divide the boundaries of each character. Finally, the identification result can be obtained by a feature fused median calculation using a neural network.

Moreover, Taiwan Patent No.191905 discloses an automatic mobile license plate identification system, which comprises an image acquiring device and an image processing device that can be installed in a car to perform automatic identification on a static or moving car being monitored. The image acquiring device is capable of acquiring the image of the license plate and transmitting the image into the image processing device. The image processing device performs a precise acquiring process on the license plate characters based on fuzzy inference and performs a character identification process on the characters using character structure analysis. Therefore, identification errors due to license plate contamination, bending, character contamination or deflexion can be prevented.

Taiwan Patent No.123259 discloses a license plate number identification apparatus installed at a spot where cars pass by so as to automatically identify the license plate number of a car. The license plate number identification apparatus uses an image acquiring device capable of acquiring an image containing the license plate and an image processing unit capable of checking the digital image according to features of the license plate number to find the license plate location, specify the range of characters, divide the characters to achieve feature identification of each characters.

Moreover, U.S. Pat. No. 4,817,166 discloses a method for reading a license plate by acquiring the boundary features such as length, height, and width of the characters on the license plate. With such information regarding the character features, geometric features of the characters such as the locations and shapes of convex hulls, turns and holes are analyzed. Finally, the structure of each character on the license plate is analyzed according to the results of the aforegoing analysis.

Moreover, U.S. Pat. No. 6,553,131 discloses an identification technology using a smart image acquiring device to perform license plate identification. A processor is installed inside the image acquiring device to perform license plate information identification. In this technology, image identification is implemented by determining a base line according to the brightness and location of the license plate image and a blur region. The image having a base line is then processed by projection to obtain the location of each character on the license plate. A statistic-based method is used so that each character is provided with a confidence index. Finally, character information on the license plate is determined according to the confidence index.

Moreover, U.S. Pat. No. 5,425,108 discloses a license plate image identification technology, wherein the acquired license plate image is processed by fuzzy interfere and the features of the license plate image is identified by structure analysis using a neural network features.

Moreover, U.S. Pat. No. 6,473,517 discloses a license plate identification technology, wherein the license plate image is identified by character segmentation. In this technology, the license plate image is divided into a plurality of regions to be converted into possible character regions (or suspected character regions). Then, the possible character regions are identified to obtain a confidence index for image identification based thereon.

U.S. Pat. No. 5,081,685 discloses a license plate identification technology, wherein image intensity information is used to identify the characters on the license plate. In this technology, the characters are separated from the background on the license plate so as to obtain the outlines of the characters by a tracking process.

SUMMARY OF THE INVENTION

The present invention provides a method and a system for image identification and identification result output, which determine conditions for acquiring the image according to features of the image and compare the conditions with sample images corresponding to the conditions.

The present invention provides a method and a system for image identification and identification result output, wherein pixels in the sample images are provided with different weights and then calculated with images to be identified to obtain similarity indexes, which are to be sorted to output a least one of comparison results.

The present invention provides a method and a system for image identification and identification result output, which can be used to identify the identification mark on a carrier. With the use of the identification mark, word feature is enhanced. The word identification technology is used to obtain a plurality of results and limit the range of search, which helps the user to identify cars that are suspected to cause accidents.

In one embodiment, the present invention provides a method for image identification and identification result output, comprising steps of: providing an image to be identified comprising a region of interest thereon; acquiring a feature in the region of interest; determining a rotating angle based on at least one direction according to the feature; and comparing the image with sample images in a database corresponding to the rotating angle to obtain at least one identification result.

In another embodiment, the present invention further provides a system for image identification and identification result output, comprising: a database capable of providing a plurality of sample images; an image acquiring unit capable of acquiring an image; a feature acquiring unit capable of acquiring all features in the region of interest on the image; an operation and processing unit capable of determining a rotating angle based on at least one direction in the region of interest according to the feature and comparing an identification information image with the sample images corresponding to the rotating angle in the database to obtain at least one identification result; and an identification and output unit being electrically connected to the operation and processing unit to output at least one identification result.

BRIEF DESCRIPTION OF THE DRAWINGS

The objects and spirits of the embodiments of the present invention will be readily understood by the accompanying drawings and detailed descriptions, wherein.

DETAILED DESCRIPTION OF THE PREFERRED EMBODIMENT

The present invention can be exemplified but not limited by various embodiments as described hereinafter.

Figure 1A:
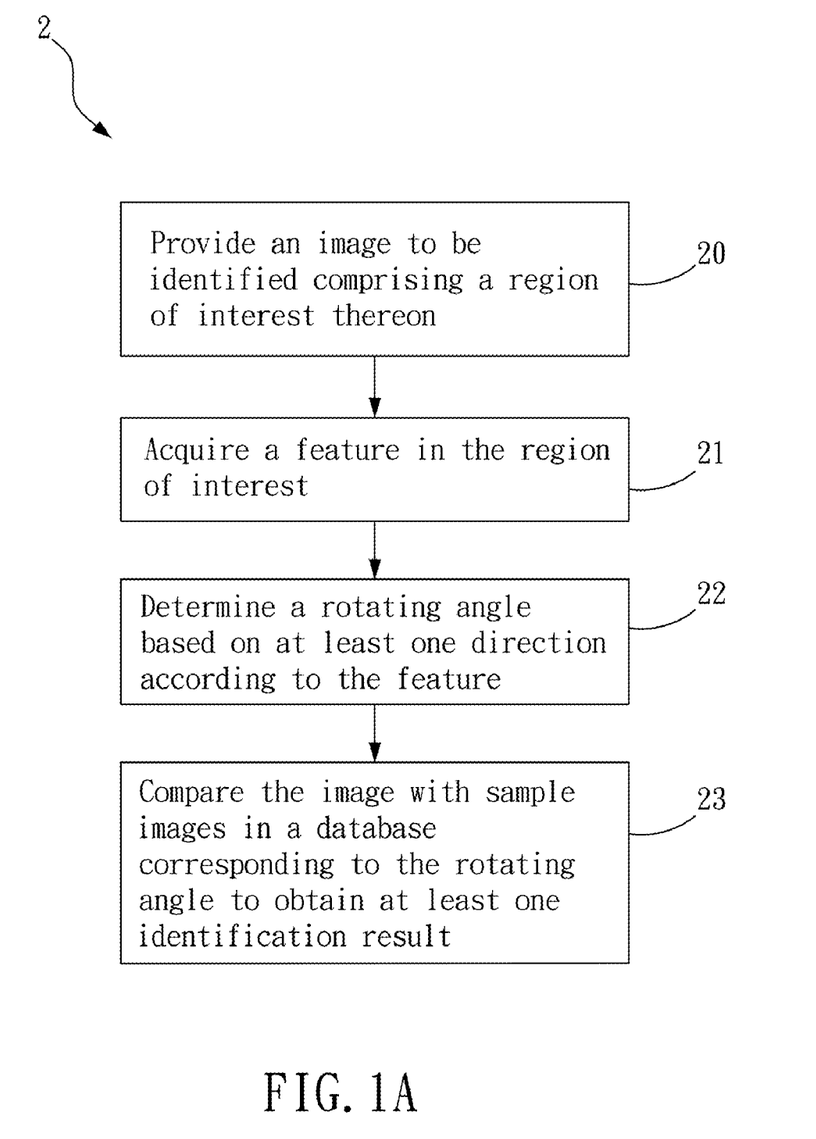
FIG. 1A is a flowchart of a method for image identification and identification result output according to one embodiment of the present invention.

Please refer to FIG. 1A, which is a flowchart of a method for image identification and identification result output according to one embodiment of the present invention. The method starts with step 20 to provide an image to be identified. The image to be identified comprises a region of interest thereon. The image to be identified may be any image with information, for example, an image of a carrier. The carrier may be a person or a movable/non-movable object with information to be identified. In this flowchart, the carrier is a vehicle (such as a car or a motorcycle), but not limited thereto. The region of interest denotes a region be identified in the image to be identified, which comprises an identification information. Taking a car for example, the region of interest is a region enclosed by the boundary of the license plate or a region covering the object with identification information (for example, side doors or back door of a car). Certainly, the region of interest may also be an image region composed of characters or symbols in the identification information. The identification information represents the combinations of characters on the carrier, for example, the license plate number. Moreover, the image is capable of being acquired by an image acquiring unit such as a CCD or CMOS (but not limited thereto) image acquiring unit.

Figure 1B:
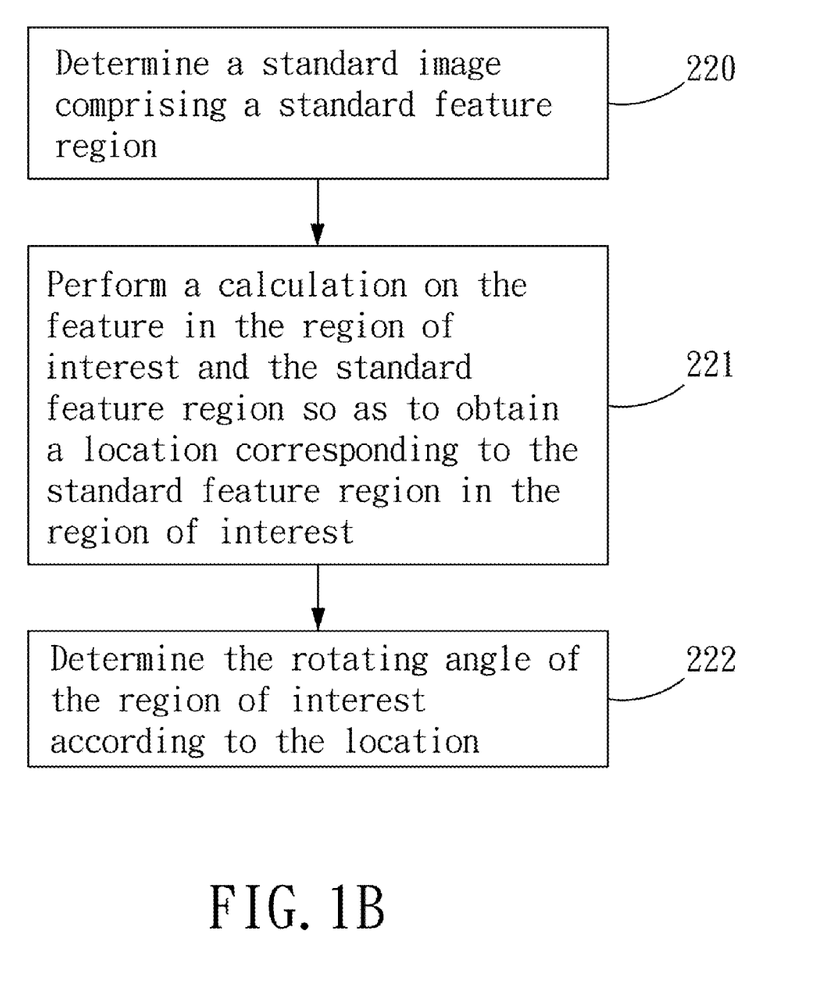
FIG. 1B is a flowchart of a step of determining a rotating angle.
Figure 2A:
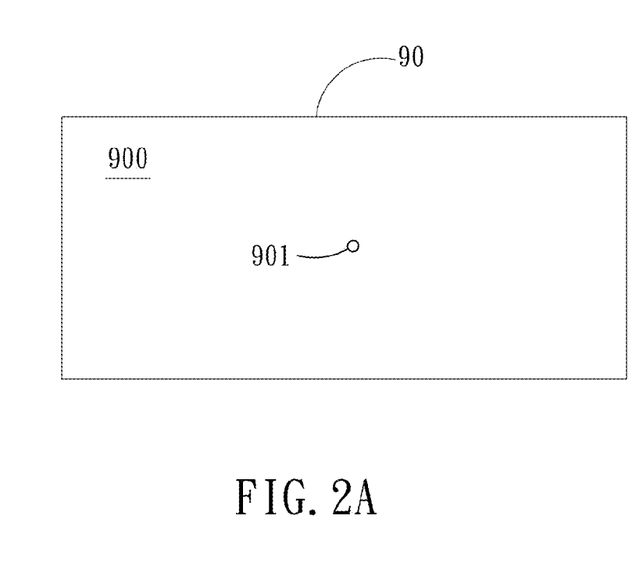
FIG. 2A is a schematic diagram of a standard image according to the present invention.

Then step 21 is performed to acquire a feature in the region of interest. Taking the license plate for example, the feature is the contrast, greyscale, chrominance or spectrum on the outline of the license plate. In another embodiment, the feature may also be the contrast, greyscale, chrominance or spectrum in the identification information in the region of interest. Step 22 determines a rotating angle based on at least one direction according to the feature according to the feature, as shown in FIG. 1B. The step of determining the rotating angle comprises steps as described herein. Firstly, step 220 determines a standard image comprising a standard feature region 900. FIG. 2A is a schematic diagram of a standard image. The standard image 90 is formed by providing an image with specific size according to the size of the license plate. The size of the image is determined according to practical demand and is not limited as previously described. The standard image 90 may also be formed by acquiring the license plate image from a clear image after a clear carrier image is acquired so that the license plate image is regarded as a standard image. The information in the aforesaid standard image corresponds to the information in the region of interest in step 20.

Figure 2B:
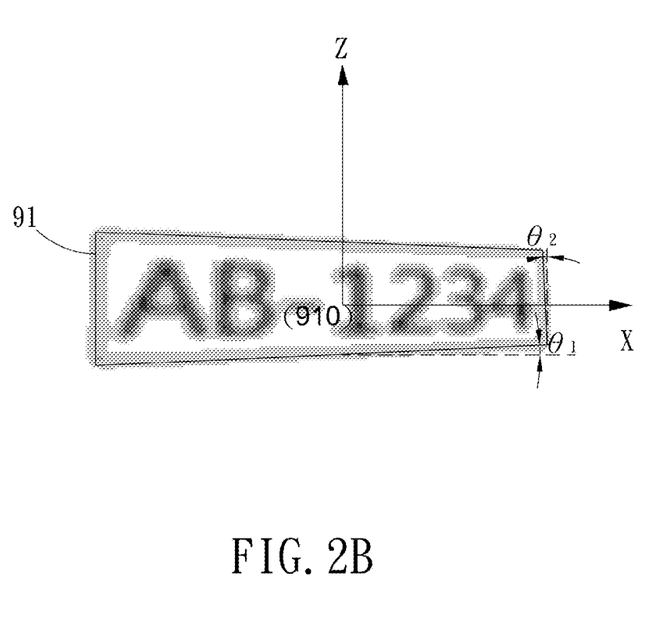
FIG. 2B is a schematic diagram of a region of interest according to the present invention.

After the standard image is determined, step 221 performs a calculation on the feature in the region of interest and the standard feature region so as to obtain a location corresponding to the standard feature region in the region of interest. In the present step, the calculation is based on geometric matching, which is conventional. The calculation is performed to compare the standard image with the image in the region of interest to obtain a specific location in the standard image. The specific location is not limited and can be exemplified by a center location in the standard feature region 900. Please refer to FIG. 2A and FIG. 2B, wherein FIG. 2B is a schematic diagram of a region of interest in step 20 representing a license plate image. Based on geometric matching, location 910 corresponding to location 901 in the standard feature region 900 can be obtained in the region of interest 91 in FIG. 2B. Certainly, the calculation for obtaining the corresponding location is not limited to geometric matching.

Figure 2C:
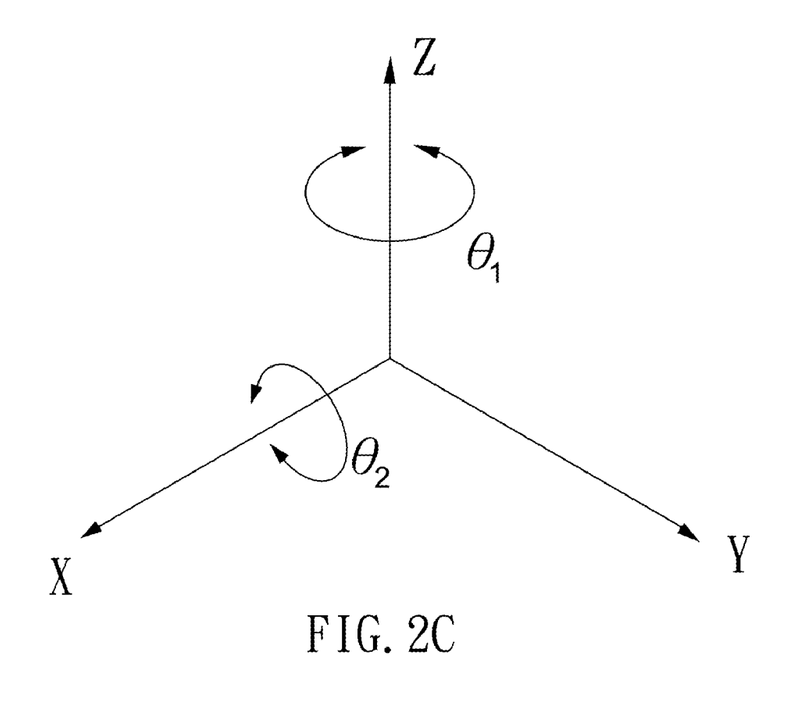
FIG. 2C is a schematic diagram showing the generation of rotating angles.

After the location 910 corresponding to location 901 is obtained in the region of interest 91, step 222 determines the rotating angle of the region of interest according to the location. In the present step, location 910 is used as a base for establishing a coordinate system so as to obtain the rotating angle based on at least one direction based on the coordinate system on the boundary of the region of interest. The determined rotating angles are based on a first direction (X) and a second direction (Z). According to the calculation, $\theta_1$ and $\theta_2$ denote the rotating angles based on the coordinate system established by the boundary of the region of interest and location 910 in FIG. 2B. Rotating angles $\theta_1$ and $\theta_2$ are attributed to the turn of a moving carrier or the location where the image is acquired. As a result, the license plate exhibits rotational momentum on Z-axis or X-axis with respect to the image acquiring units, as shown in FIG. 2C. Therefore, the image acquired by the image acquiring units exhibits rotating angles $\theta_1$ and $\theta_2$. The number of rotating angles depends on the acquired image, and is not limited to $\theta_1$ and $\theta_2$ in FIG. 2B. In other words, rotating angles may be referred to the angle between one side or two sides (FIG. 2B) of the region of interest and X-axis or Z-axis. Moreover, in step 222, the features on the outline of the region of interest can be compared with the corresponding standard image to determine the distance for acquiring the image to obtain the scale relation between the feature region and the standard image. For example, the standard image in FIG. 2A is the image acquired at a location with a distance L or a standard image acquired from a standard object at a distance L. As a result, the scale relation between the feature region and the standard image and the image acquiring distance can be obtained by comparing the feature region with the standard image.

Figure 3A:
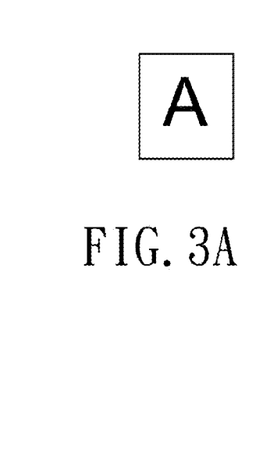
FIG. 3A is a front view of an acquired sample image.
Figure 3B:
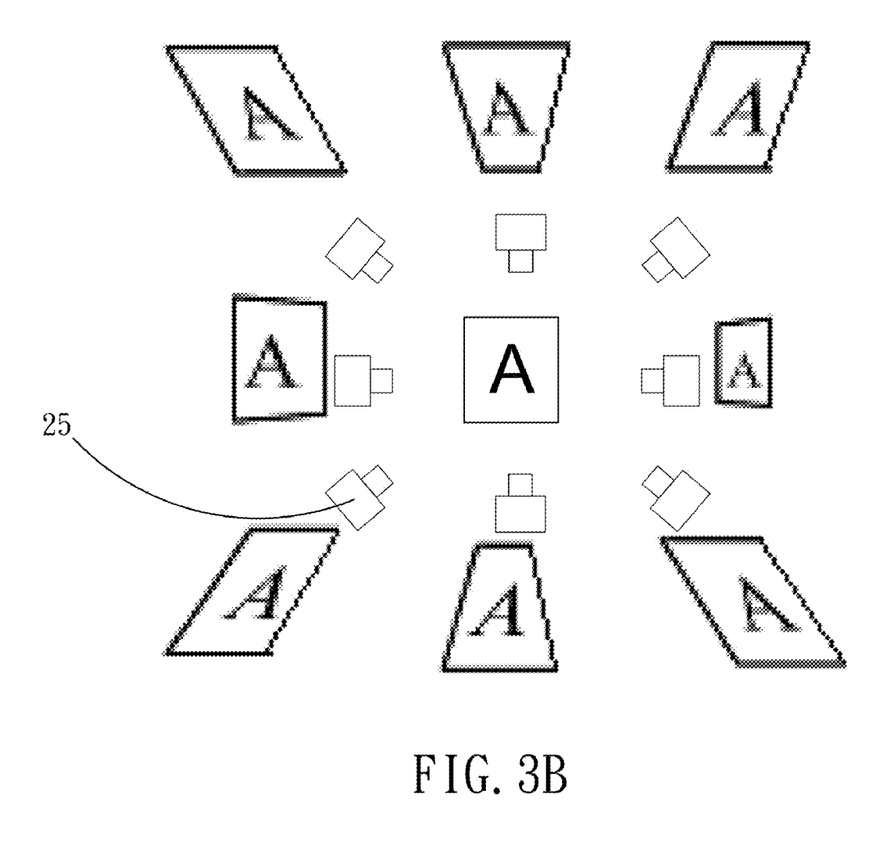
FIG. 3B shows images acquired by various image acquiring units with different viewing angles.

Referring to FIG. 1, after the rotating angle or the combination of the rotating angle and the scale relation is obtained, step 23 compares the identification information image with sample images in a database corresponding to the rotating angle to obtain at least one identification result. In the present step, the sample images previously provided can be stored in the database. The sample image, exemplified by character A in FIG. 3A, can be established by acquiring a front view of character A. Moreover, FIG. 3B shows images of character A acquired by various image acquiring units 25 with different viewing angles. The image acquiring units are installed at locations based on the coordinate system in FIG. 3B. The different results in FIG. 3B are attributed to images acquired at different horizontal rotating angles $\theta_1$ or different vertical rotating angles $\theta_2$ or combination thereof. The rotating angle based on X-axis direction (horizontal direction) is within a range between ±60 degrees, but not limited thereto. The rotating angle based on Z-axis direction is within a range between ±60 degrees, but not limited thereto. The images are stored in the database after being acquired from the character A by image acquiring units 25 at different rotating angles. Similarly, more images are acquired from other characters so as to establish the database. The angle is limited to practical demand according to the system and the data traffic. In addition to the rotating angle, the distance for acquiring images is another parameter to establish a database with multiple parameters.

Figure 4:
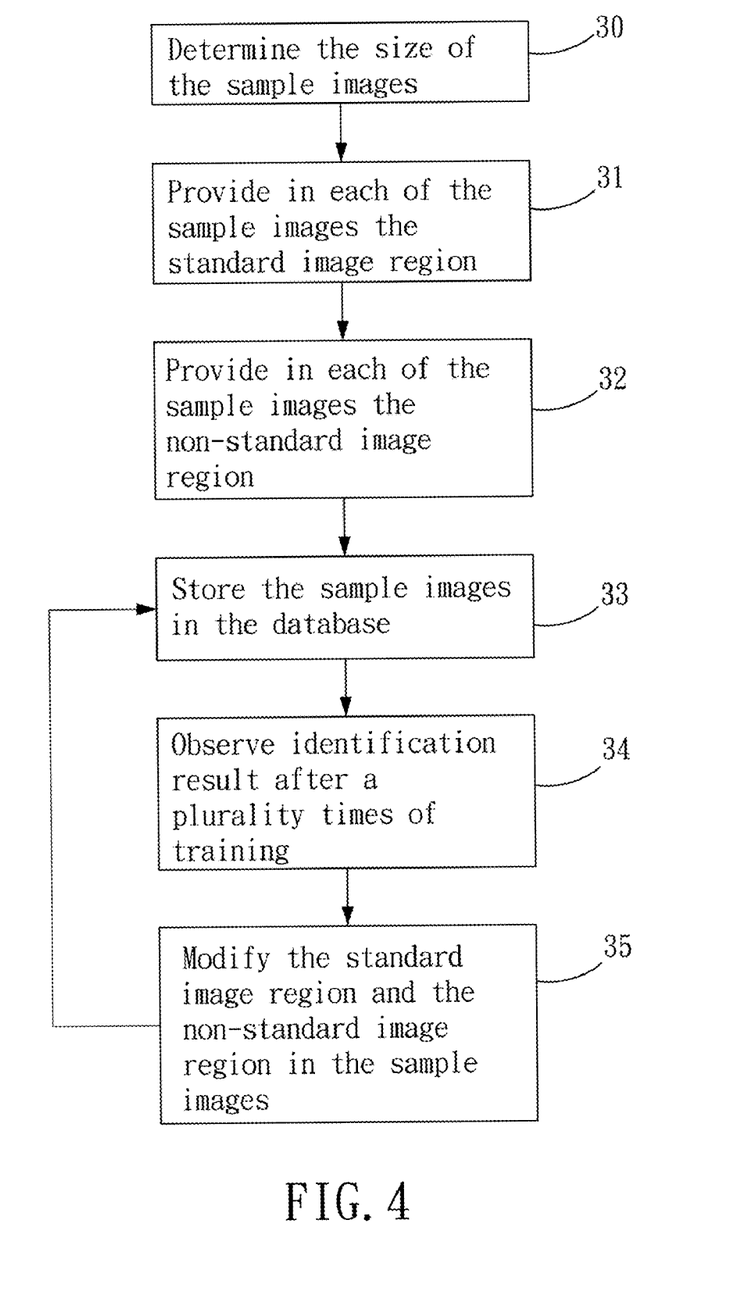
FIG. 4 is a flowchart of a step of providing sample images according to the present invention.
Figure 5A:
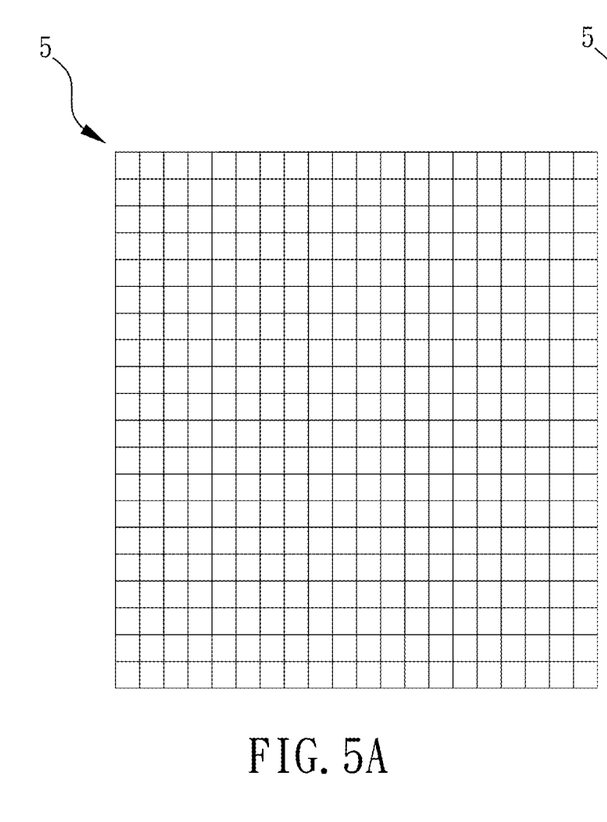
FIG. 5A is a schematic diagram of a sample image.
Figure 5B:
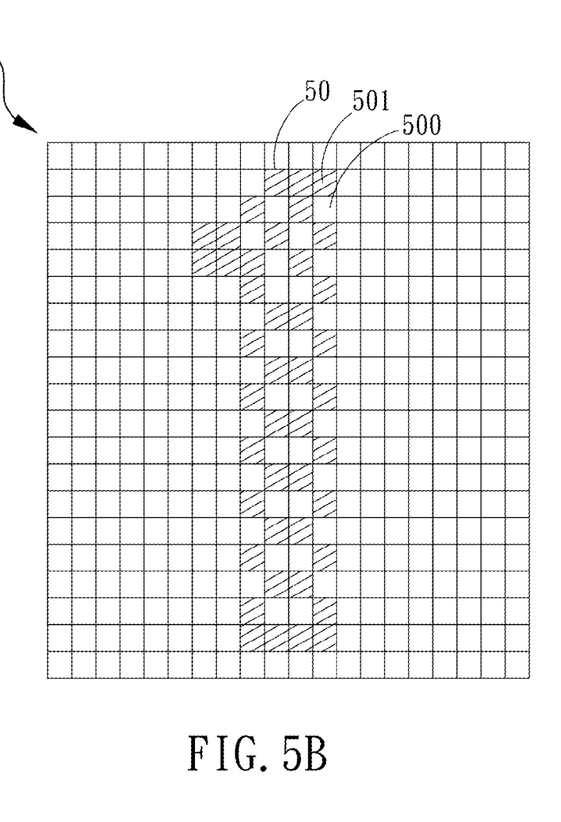
FIG. 5B is a schematic diagram showing a standard image region in a sample image.

Please refer to FIG. 4, which is a flowchart of a step of providing sample images according to the present invention. Firstly, step 30 determines the size of the standard image region, as shown in FIG. 5A. The size of the sample image 5 is determined according to the standard image as shown in FIG. 2. Once the size of the standard image is determined, the size for each character in the identification information can be determined. Then, step 31 is performed to provide the standard image region 50 in the sample image 5. The standard image region 50 comprises a plurality of pixels 500 and 501 to form a character, a digit, a word or a pattern as represented by the sample image. Referring to FIG. 5B, the present embodiment is exemplified by a digit "1". In the sample image 5, each pixel 500 and 501 is given a proper greyscale value to form a standard image region 50, which draws the outline of the digit 1. Then, in the standard image region 50, specific pixels 501 (pixels with oblique lines) are given a specific weight value. The greyscale value and the weight value are determined according to the user's demand. That is, each weight value may be different or identical. In the present embodiment, the weight value is positive, for example, 2. In the standard image region 50, the greyscale value and the weight value for each pixel 500 and 501 are combined as the first feature value.

Figure 5C:
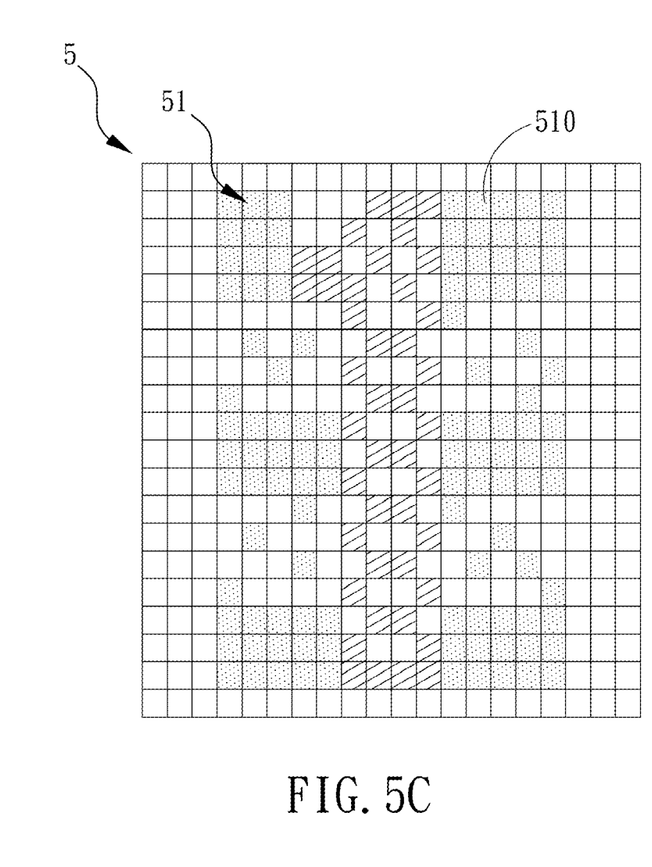
FIG. 5C and FIG. 5D are respectively a schematic diagram showing a standard image region and a non-standard image region in a sample image.

Referring to FIG. 4, step 32 is performed to provide in the sample image the non-standard image region 51 as shown in FIG. 5C. The non-standard image region 51 represents the content that the standard image region 50 is taken for. For example, digit "1" is often taken for letter "I" or "L" or even letter "E. Therefore, locations for pixels 510 possibly mis-identified (pixels with dots) are given proper greyscale values and weight values as the second feature values corresponding to pixels 510. In the present embodiment, locations for the pixels 510 in the non-standard image region 51 are determined according to the easily mis-identified character, digit or word in the standard image region 50, which is not restricted. The greyscale values and weight values are determined according to practical demand. In the present embodiment, the weight values in the non-standard image region 51 are negative, for example, −2.

Figure 5D:
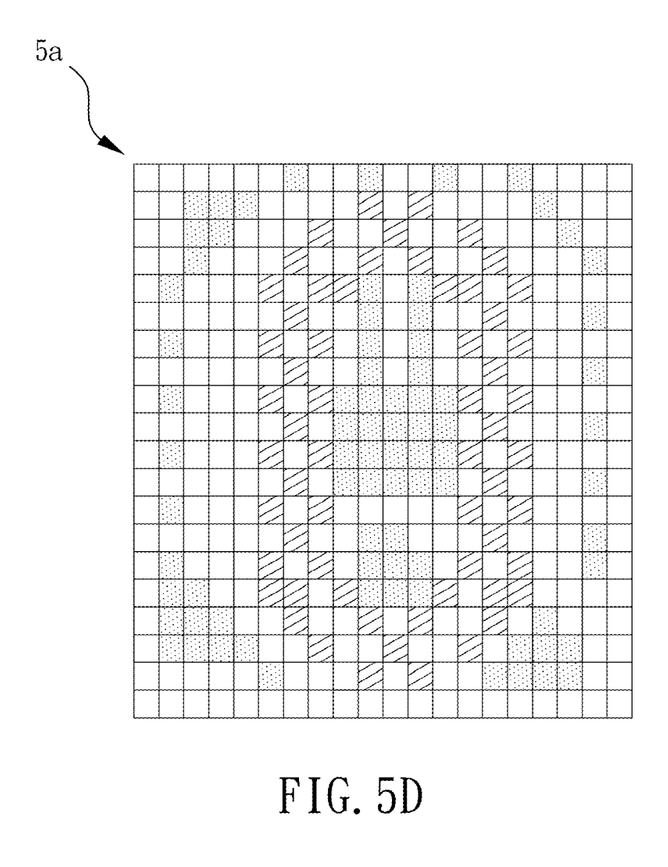

As shown in FIG. 5D, which is a schematic diagram showing another sample image 5*a* provided according to digit 0, the sample image 5*a* also comprises a standard image region and a non-standard image region. The pattern constructed by the pixels in the standard image region draws the outline of a digit "0". Similarly, the pattern constructed by the pixels in the non-standard image region denotes a word that digit "0" is taken for. For example, digit "0" is often taken for letter "Q" or digit "8". Steps 221 and 222 can be performed using image processing software exemplified by, but not limited to, MS Paint.

Referring to FIG. 4, step 33 is performed to store the sample images, such as 0 to 9, A to Z and a to z, in the database. Then, in step 34, the identification result is observed after a plurality times of training. In the present step, different images are compared with the database for identification and calculation to identify whether the result is correct. After the plurality times of testing, step 35 is performed to modify the weight values, greyscale values or locations of pixels in the standard image region and the non-standard image region in the sample images according to the identification result.

Even though the flowchart is exemplified by a front view image, the steps for other viewing angles or distances for image acquiring are similar to those as previously described and thus descriptions thereof are not presented. For example, when the rotating angle based on Z-axis ($\theta_1$) is 0, the image information of each character is established when the distance for image acquiring is L and the rotating angle based on X-axis direction is within a range between ±10 degrees. Then, the distance for image acquiring is changed to 0.5 L, and the image information of each character is established when the distance for image acquiring is L and the rotating angle based on X-axis direction is within a range between ±10 degrees. Then, the distance for image acquiring is changed to 1.5 L, and the image information of each character is established when the distance for image acquiring is L and the rotating angle based on X-axis direction is within a range between ±10 degrees. Then, the rotating angle based on Z-axis is changed to repeat the foregoing steps and complete a 3-D database.

Figure 6:
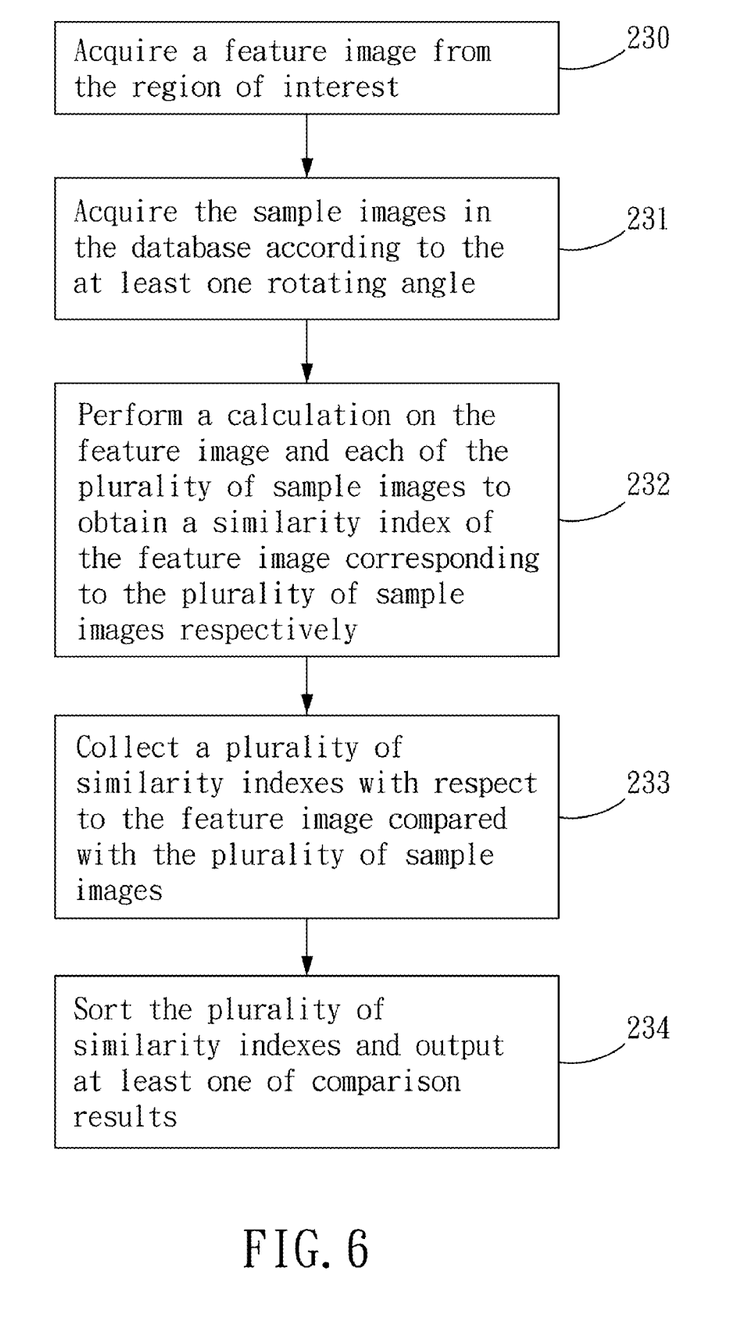
FIG. 6 is a flowchart of a step of image identification according to the present invention.

Please refer to FIG. 6, which is a flowchart of step 23 of image identification according to the present invention. In step 230, a feature image corresponding to the identification information is acquired from the region of interest. Before acquiring the feature image, the image may be enhanced to achieve better identification. Taking FIG. 2B for example, the identification information is "AB-1234". Therefore, the feature image may be any combinations of "A", "B", "1", "2", "3" and "4". According to the scale relation, the feature image is normalized to make sure that the size of the feature image is identical to the size of the sample image. Then, step 231 is performed to acquire the sample images in the database according to the at least one rotating angle or the information of combinations of the at least one rotating angle and the distance for image acquiring. Then, step 232 performs a calculation on a third feature value of each pixel in the feature image and the first feature value or the second feature value corresponding to each pixel in the plurality of sample images corresponding to the rotating angle to obtain a similarity index of the feature image corresponding to the plurality of sample images respectively.

Please refer to FIG. 4, which is a schematic diagram showing a feature image. The normalized feature image can be processed with each of the sample images for further calculation to obtain a corresponding similarity index $C_{uv}$. The calculation is based on normalized correlation matching, as described in equation (1). Normalized correlation matching is aimed at calculating the relation between the feature image and the sample image, wherein the standard deviation of the greyscale value of each image is regarded as a vector and is multiplied with the weight value so as to determine the optimal location. The standard correlation value is within the range between −1 and 1 with higher similarity as it gets closer to 1. When $C_{uv}$ reaches its maximum, an optimal location is achieved.

$$C_{uv} = \frac{\sum (u_i - \bar{u})(v_i - \bar{v}) \times w_i}{[\sum (u_i - \bar{u})^2 \sum (v_i - \bar{v})^2]^{1/2}} \tag{1}$$

wherein $u_i$ is the greyscale value of each pixel in the sample image, while $v_i$ is the greyscale value of each pixel in the feature image, i.e., the third feature value. Moreover, $\bar{u}$ is the average greyscale value of all the pixels in the sample image, while $\bar{v}$ is the average greyscale value of all the pixels in the feature image. $w_i$ is the weight value of the pixels in the standard image region and the non-standard image region in the sample image. The weight value of pixels in the other region is 1.

Figure 7:
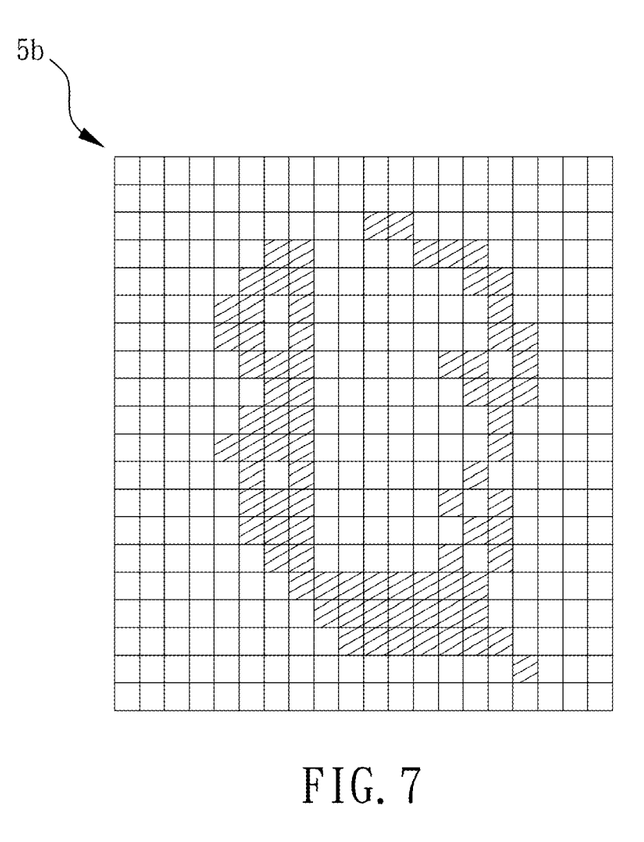
FIG. 7 is a schematic diagram of a feature image.

Based on equation (1), a calculation is performed on each pixel in FIG. 7 and each pixel in the sample image. In other words, the greyscale value in each pixel FIG. 7 is used as $v_i$ in equation (1). Each greyscale value and weight value in the sample image is used as $u_i$ and $w_i$ in equation (1).

Figure 8:
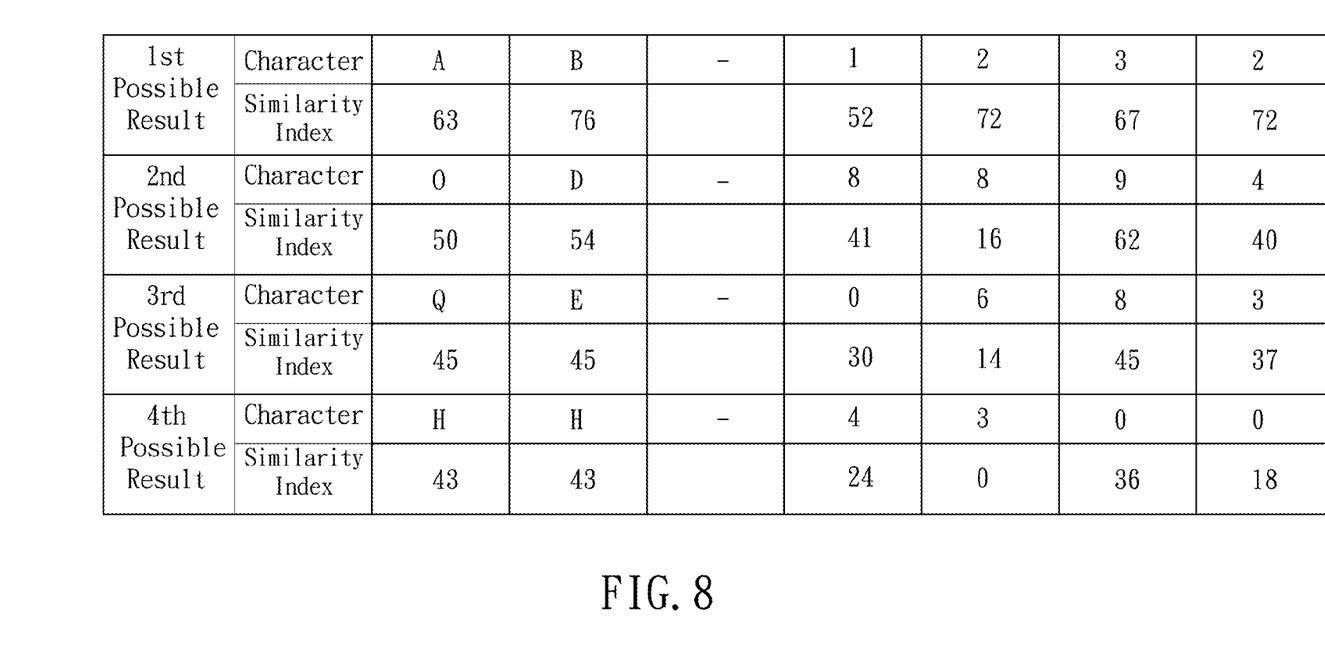
FIG. 8 is a table for sorting the comparison results according to the present invention.

For example, FIG. 7 and the sample image (representing digit 1) in FIG. 5C (representing digit 1) and the sample image in FIG. 5D (representing digit 0) are calculated to obtain the similarity index $c_{uv}$ of the feature image in FIG. 7 corresponding to FIG. 5C and FIG. 5D. Referring to FIG. 6, after obtaining the similarity index, step 233 is performed to collect a plurality of similarity indexes with respect to the feature image compared with the plurality of sample images. In the present step, the similarity indexes are sorted from the identification result with highest possibility to the identification result with lowest possibility. Finally, in step 234, the comparison results are output. The aforesaid step 231 to step 234 are perform to identify the feature image of one character in the identification information. Referring to FIG. 2B, since there are 7 characters in the identification information, the result shown in FIG. 8 can be obtained after step 230 to step 234 are performed on the feature image corresponding to each character. In FIG. 8, four possible results are shown. Each result represents one possible combination of characters on the license plate. Each character in the first possible result has the highest similarity, which is followed by the second, the third and the fourth possible results. Taking the first possible result for example, the characters on the license plate are possibly AB-1232, wherein the first character "A" has a similarity index of 63, the second character "B" has a similarity index of 76, the third character is "-", the fourth character "1" has a similarity index of 52, the fifth character "2" has a similarity index of 72, the sixth character "3" has a similarity index of 67, and the seventh character "2" has a similarity index of 72. Certainly, the user can also determine other combinations of characters on the license plate number according to the results in FIG. 8 and visual estimation on the image to be identified.

Figure 9A:
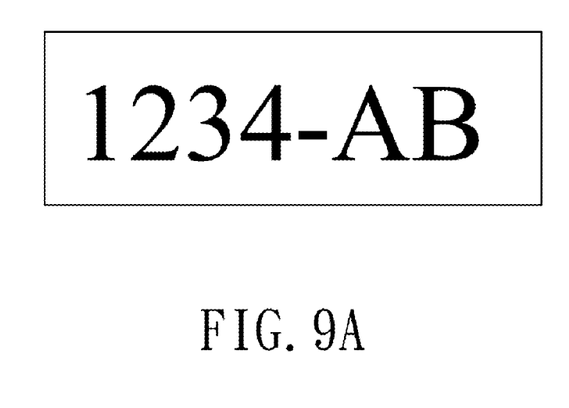
FIG. 9A and FIG. 9B depict schematically identification information with different combinations.
Figure 9B:
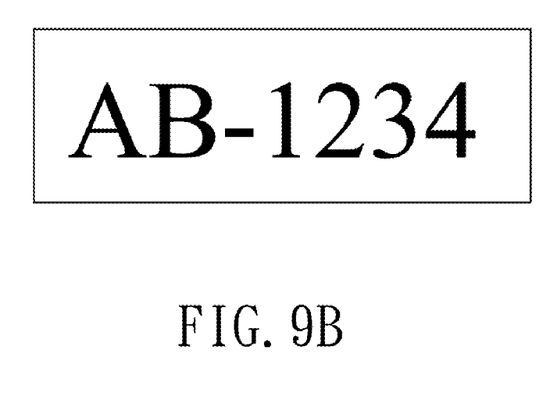

In image identification, images of impossible characters or digits can be excluded according to various combinations that form the identification marks. For example, in one embodiment, the identification mark can be formed as a combination of 4 leading digits and 2 following letters (as shown in FIG. 9A) with a "-" therebetween. In another identification mark, 2 leading letters and 4 following digits (as shown in FIG. 9B) are combined, with a "-" therebetween. In the present embodiment, there are two kinds of combinations to exemplify the license plates. Therefore, images of impossible characters or digits can be excluded according to the relative locations of the feature images in the identification mark so as to increase identification efficiency.

Figure 10:
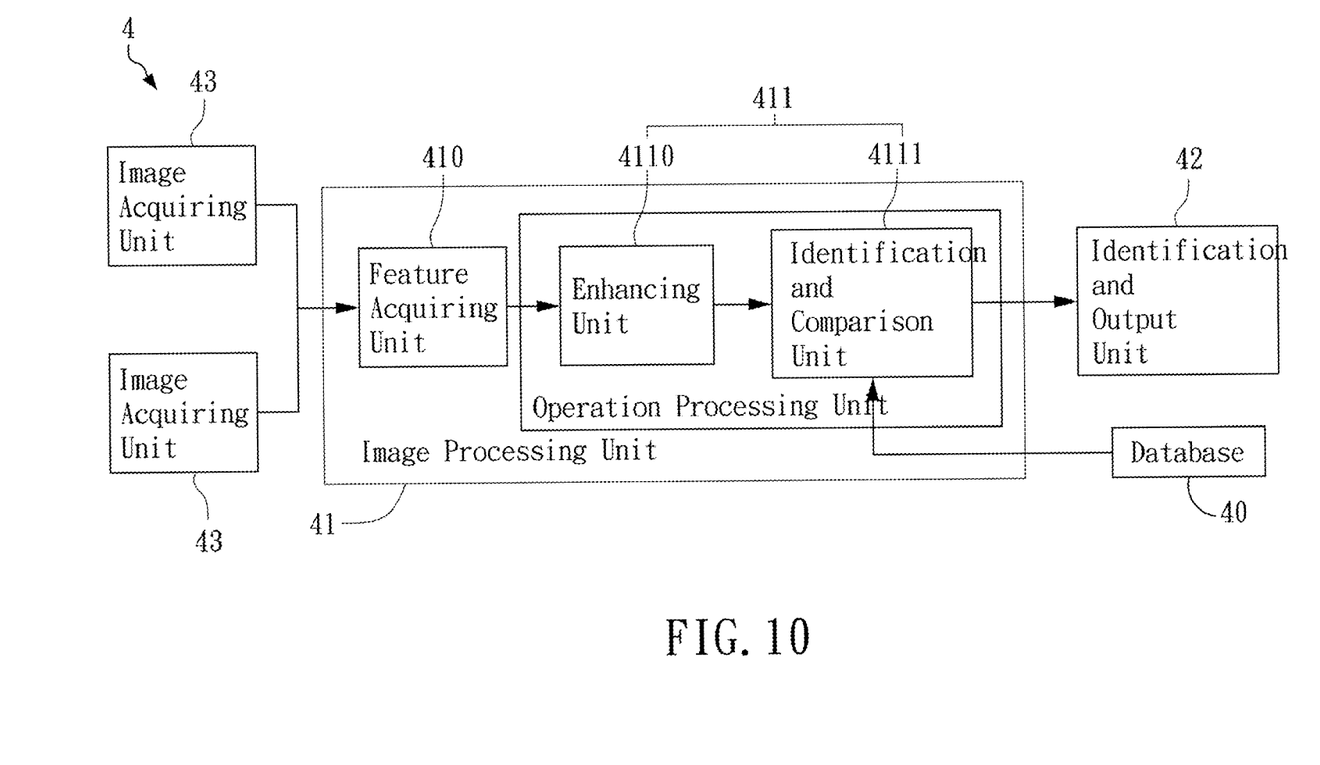
FIG. 10 is a schematic diagram of a system for image identification and identification result output according to the present invention.

Please refer to FIG. 10, which is a schematic diagram of a system for image identification and identification result output according to the present invention. The system 4 is capable of implementing the flowchart in FIG. 1, FIG. 4 or FIG. 6 for image identification and identification result output. The system 4 comprises a database 40, an image processing unit 41, an identification and output unit 42 and a plurality of image acquiring units 43. The database 40 is capable of providing a plurality of sample images. The sample image is different from the images acquired by the image acquiring units 43 in viewing angles and distances. The plurality of image acquiring units 43 are electrically connected to the image processing unit 41. Each image acquiring unit 43 is capable of acquiring an image of an object and transmits the image to the image processing unit 41 for identification. In the present embodiment, each of the image acquiring units 43 is capable of acquiring dynamic or static images of the object. The image comprises a region of interest for carrier identification. The region of interest comprises identification information therein. The image acquiring units may be CCD or CMOS image acquiring units, but not limited thereto. The object may be a carrier with an identification mark thereon, for example, the license plate number of a car. Moreover, the object may also be a word, a character, a digit or combinations thereof.

The image processing unit 41 comprises a feature acquiring unit 410 and an operation and processing unit 411. The feature acquiring unit 410 is capable of acquiring a feature in the region of interest and each character feature in the identification information. The features include contrast, greyscale, chrominance or spectrum. Then, the operation and processing unit 411 performs a calculation. In the present embodiment, the operation and processing unit 411 further comprises an enhancing unit 4110 and an identification and comparison unit 4111. The enhancing unit 4110 is capable of improving the feature image (enhancing the contrast and the edge) and normalizing the feature image (adjusting the image scale) so that the features on the feature image are more significant for identification. The identification and comparison unit 4111 is capable of determining a rotating angle based on at least one direction in the region of interest, acquiring the distance and scale relation and comparing an identification information image with the sample images corresponding to the rotating angle in the database to obtain at least one identification result according to the feature. The identification and comparison unit 4111 also compares the feature image with the sample image to obtain the plurality of similarity indexes corresponding thereto, and sorts the plurality of similarity indexes to output at least one of comparison results. The identification and output unit 42 is electrically connected to the processing unit 41 to output the comparison result identified by the processing unit 41.

Accordingly, the present invention discloses a method and a system for image identification and identification result output to enhance the identification efficiency and precision. Therefore, the present invention is useful, novel and non-obvious.

Although this invention has been disclosed and illustrated with reference to particular embodiments, the principles involved are susceptible for use in numerous other embodiments that will be apparent to persons skilled in the art. This invention is, therefore, to be limited only as indicated by the scope of the appended claims.

What is claimed is:

1. A method for image identification and identification result output, comprising steps of:
providing an image to be identified comprising a region of interest thereon;
acquiring a feature in the region of interest;
determining a rotating angle based on at least one direction according to the feature; and
comparing the image with sample images in a database corresponding to the rotating angle to obtain at least one identification result,
wherein the step of comparing comprises the steps of:
acquiring a feature image from the region of interest;
acquiring the sample images in the database according to the at least one rotating angle, each sample image having respectively a standard image region and at least one non-standard image region, wherein the standard image region has pixels corresponding to a first feature value respectively, and the non-standard image region has pixels corresponding to a second feature value respectively;
performing a normalized correlation matching calculation on a third feature value of each pixel in the feature image and the first feature value or the second feature value corresponding to each pixel in the plurality of sample images to obtain a similarity index of the feature image corresponding to the plurality of sample images respectively;
collecting a plurality of similarity indexes with respect to the feature image compared with the plurality of sample images; and
sorting the plurality of similarity indexes and outputting at least one of comparison results;
wherein the step of acquiring the sample images comprise the steps of:
determining the size of the sample images;
providing in each of the sample images the standard image region;
providing in each of the sample images the non-standard image region;
storing the sample images in the database;
observing the identification result after a plurality times of training; and
modifying the standard image region and the non-standard image region in the sample images; and
wherein the non-standard image region is formed by providing a pixel with the first feature value and the second feature value in the standard image region according to mis-identified characters in the standard image region.

2. A system for image identification and identification result output, comprising:
a database capable of providing a plurality of sample images, each sample image having respectively a standard image region and at least one non-standard image region, the standard image region having pixels corresponding to a first feature value respectively, and the non-standard image region having pixels corresponding to a second feature value respectively, the non-standard image region being formed by providing a pixel with the first feature value and the second feature value in the standard image region according to mis-identified characters in the standard image region;
an image acquiring unit capable of acquiring an image having a region of interest;
a feature acquiring unit capable of acquiring a feature in the region of interest on the image;
an operation and processing unit capable of determining a rotating angle based on at least one direction in the region of interest according to the feature, acquiring a feature image from the region of interest, acquiring the sample images in the database according to the at least one rotating angle, performing a normalized correlation matching calculation on a third feature value of each pixel in the feature image and the first feature value or the second feature value corresponding to each pixel in the plurality of sample images to obtain a similarity index of the feature image corresponding to the plurality of sample images respectively, collecting a plurality of similarity indexes with respect to the feature image compared with the plurality of sample images, and sorting the plurality of similarity indexes and outputting at least one of comparison results, wherein the operation and processing unit determines the sizes of the sample images, identifies a standard image region and a non-standard image region in each of the sample images, stores the sample images in the database, obtains an identification result after training a plurality of times, and modifies the standard image region and the non-standard image region in the sample images; and an identification and output unit that is electrically connected to the operation and processing unit to output at least one identification result.

3. The system for image identification and identification result output as recited in claim 2, wherein the operation and processing unit further comprises an enhancing unit capable of enhancing the image.

4. The system for image identification and identification result output as recited in claim 2, wherein the angle is determined by geometric matching.

5. The system for image identification and identification result output as recited in claim 2, wherein the rotating angle based on a first direction is within a range between ±60 degrees.

6. The system for image identification and identification result output as recited in claim 2, wherein the rotating angle based on a second direction is within a range between ±60 degrees.

7. The system for image identification and identification result output as recited in claim 2, wherein each sample image has respectively a standard image region and at least one non-standard image region, wherein the standard image region has pixels corresponding to a first feature value, and wherein the non-standard image region has pixels corresponding to a second feature value.

8. The system for image identification and identification result output as recited in claim 7, wherein the non-standard image region is formed by providing a pixel with the first feature value and the second feature value in the standard image region according to mis-identified characters in the standard image region.

9. The system for image identification and identification result output as recited in claim 2, wherein the operation and processing unit excludes images of impossible characters or digits according to a relative location of the feature image in the identification mark when each feature image is compared with the plurality of sample images stored in the database by the operation and processing unit.

10. The system for image identification and identification result output as recited in claim 2, wherein a normalized correlation matching calculation is performed on a third feature value of each pixel in the feature image and the first feature value or the second feature value corresponding to each pixel in the plurality of sample images to obtain a similarity index of the feature image corresponding to the plurality of sample images respectively.

11. The system for image identification and identification result output as recited in claim 2, wherein the region of interest comprises identification information.

12. The system for image identification and identification result output as recited in claim 11, wherein the feature comprises contrast, greyscale, chrominance or spectrum on the boundary of identification information.

13. The system for image identification and identification result output as recited in claim 2, wherein the feature comprises contrast, greyscale, chrominance or spectrum on the boundary of the region of interest.

14. The system for image identification and identification result output as recited in claim 2, wherein the operation and processing unit determines the scale relation between the size of the region of interest and the sample image according to the feature.

15. The method for image identification and identification result output as recited in claim 1, wherein the step of determining the rotating angle comprises steps of:

determining a standard image comprising a standard feature region; performing a calculation on the feature in the region of interest and the standard feature region so as to obtain a location corresponding to the standard feature region in the region of interest; and determining the rotating angle of the region of interest according to the location.

16. The method for image identification and identification result output as recited in claim 15, wherein the calculation is based on geometric matching.

17. The method for image identification and identification result output as recited in claim 1, wherein the rotating angle is based on a first direction and is within a range between ±60 degrees.

18. The method for image identification and identification result output as recited in claim 1, wherein the rotating angle is based on a second direction and is within a range between ±60 degrees.

19. The method for image identification and identification result output as recited in claim 1, further comprising the step of determining a scale relation between the region of interest and the sample images according to the feature.

20. The method for image identification and identification result output as recited in claim 1, wherein the region of interest comprises identification information.

21. The method for image identification and identification result output as recited in claim 1, wherein the feature further comprises contrast, greyscale, chrominance or spectrum on the boundary of identification information.

22. The method for image identification and identification result output as recited in claim 1, wherein the feature comprises contrast, greyscale, chrominance or spectrum on the boundary of the region of interest.

23. The method for image identification and identification result output as recited in claim 1, wherein the region of interest is formed by the boundary of a license plate on a carrier.

24. The method for image identification and identification result output as recited in claim 1, wherein the first feature value and the second feature value are respectively a combination of a weight value and a greyscale value, and the third feature value is a greyscale value.

25. The method for image identification and identification result output as recited in claim 1, wherein normalized correlation matching is performed by dividing the product of a weight value corresponding to each pixel in the sample image, the difference between a greyscale value of each pixel and the average greyscale value in the sample image, and the difference between the greyscale value of each pixel and the average greyscale value in the feature image by the product of the standard deviation of the greyscale value of the sample image and the standard deviation of the greyscale value of the feature image.

* * * * *